(12) United States Patent
Hall (10) Patent No.: US 12,138,974 B2
(45) Date of Patent: Nov. 12, 2024

(54) TRUCK BED HITCH HOLDER

(71) Applicant: Clear Arc Industries, LLC, International Falls, MN (US)

(72) Inventor: Tyler Hall, International Falls, MN (US)

(73) Assignee: Clear Arc Industries, LLC, International Falls, MN (US)

( * ) Notice: Subject to any disclaimer, the term of this patent is extended or adjusted under 35 U.S.C. 154(b) by 137 days.

(21) Appl. No.: 18/064,643

(22) Filed: Dec. 12, 2022

(65) Prior Publication Data

US 2023/0106615 A1   Apr. 6, 2023

Related U.S. Application Data

(60) Provisional application No. 63/365,578, filed on May 31, 2022.

(51) Int. Cl.
*B60R 11/06* (2006.01)
*B60D 1/52* (2006.01)

(52) U.S. Cl.
CPC ............ *B60D 1/52* (2013.01); *B60R 11/06* (2013.01)

(58) Field of Classification Search
CPC ....................................................... B60R 11/06
USPC ............................................. 211/60.1, 70.6
See application file for complete search history.

(56) References Cited

U.S. PATENT DOCUMENTS

| | | | | |
|---|---|---|---|---|
| 4,196,919 A * | 4/1980 | Tomen | ............... | B60D 1/56 |
| | | | | 280/502 |
| D259,312 S * | 5/1981 | Nordlund | ............... | D6/569 |
| 6,832,709 B2 * | 12/2004 | Henry | ............... | B60D 1/06 |
| | | | | 224/403 |
| D604,975 S * | 12/2009 | Racanelli | ............... | D6/534 |
| 7,661,543 B1 * | 2/2010 | Townsend | ............... | B60D 1/60 |
| | | | | 280/491.1 |
| 7,815,211 B2 * | 10/2010 | Witchey | ............... | B60D 1/52 |
| | | | | 280/415.1 |
| D645,335 S * | 9/2011 | Herman | ............... | D8/349 |
| D653,592 S * | 2/2012 | Brown | ............... | D12/162 |
| 8,136,663 B2 * | 3/2012 | Foster | ............... | B60R 9/06 |
| | | | | 206/488 |
| 8,231,035 B1 * | 7/2012 | Michael | ............... | B60D 1/60 |
| | | | | 224/403 |
| 8,308,183 B1 * | 11/2012 | McElhinney, Jr. | ...... | B60D 1/60 |
| | | | | 280/491.5 |
| 8,469,429 B1 * | 6/2013 | Spronk | ............... | B60R 11/00 |
| | | | | 296/37.1 |
| D688,168 S * | 8/2013 | Buschman | ............... | D12/162 |
| D696,164 S * | 12/2013 | Townsend | ............... | D12/162 |
| 8,640,889 B2 * | 2/2014 | Gasper | ............... | A47F 5/0823 |
| | | | | 211/74 |
| D727,803 S * | 4/2015 | Borkholder | ............... | D12/162 |
| 9,321,316 B1 * | 4/2016 | Beal | ............... | B60D 1/52 |

(Continued)

OTHER PUBLICATIONS

Box Buddy®—Erickson Manufacturing, retrieved on Apr. 27, 2022, 4 pages available at: https://ericksonmfg.com/product/box-buddy/.

(Continued)

*Primary Examiner* — Justin M Larson
(74) *Attorney, Agent, or Firm* — Merchant & Gould, P.C.

(57) ABSTRACT

A hitch holder that is configured to be secured to a vehicle and which is configured to mount one or more hitches thereon when the hitch(es) is not in use so that the hitch(es) is safely and neatly stored and easily accessible when needed for use.

19 Claims, 8 Drawing Sheets

(56) References Cited

U.S. PATENT DOCUMENTS

| | | | |
|---|---|---|---|
| 9,511,721 B1* | 12/2016 | Hawkins | B60R 11/06 |
| D793,916 S* | 8/2017 | Harrison | D12/162 |
| 10,183,538 B2* | 1/2019 | Palmer | B60D 1/52 |
| D896,136 S* | 9/2020 | McQueen | D12/162 |
| D901,403 S* | 11/2020 | Ice | D13/179 |
| 10,899,403 B2* | 1/2021 | Bussell | B60D 1/58 |
| D924,041 S* | 7/2021 | Brown | D8/349 |
| D953,061 S* | 5/2022 | Wei | D6/514 |
| D960,695 S* | 8/2022 | Kuschmeader | D8/373 |
| 11,413,715 B2* | 8/2022 | Nehring | B60D 1/247 |
| D964,221 S* | 9/2022 | Sordahl | D12/162 |
| 11,511,379 B2* | 11/2022 | Nehring | B60D 1/58 |
| 11,801,881 B1* | 10/2023 | Alion | B62B 3/04 |
| D1,021,577 S* | 4/2024 | Katsma | D24/227 |
| 2003/0230608 A1* | 12/2003 | Henry | B60D 1/06 224/403 |
| 2006/0289369 A1* | 12/2006 | Sheridan | A47F 7/00 211/14 |
| 2006/0289580 A1* | 12/2006 | Faver | B60D 1/06 280/495 |
| 2007/0045986 A1* | 3/2007 | Lirot | B60D 1/48 280/495 |
| 2010/0314899 A1* | 12/2010 | Slacks | B60R 11/06 296/37.6 |
| 2012/0049484 A1* | 3/2012 | Brass | B60D 1/60 280/507 |
| 2013/0161276 A1* | 6/2013 | Breeden | A47F 7/0021 211/60.1 |
| 2016/0001711 A1* | 1/2016 | Hughes | B60D 1/58 224/403 |
| 2016/0135616 A1* | 5/2016 | Fisher | A47F 5/0006 211/13.1 |
| 2016/0303934 A1* | 10/2016 | Olson | B60R 11/06 |
| 2017/0080873 A1* | 3/2017 | Forhan | B60D 1/58 |
| 2017/0158147 A1* | 6/2017 | Harrison | B60R 11/06 |
| 2022/0088728 A1* | 3/2022 | Nehring | B60D 1/247 |
| 2022/0289122 A1 | 9/2022 | Ladosz | |

OTHER PUBLICATIONS

Introducing Stor-A-Hitch, retrieved on Apr. 27, 2022, 3 pages, available at: http://www.storahitch.com/.

Receiver Caddy, retrieved on Apr. 27, 2022, 4 pages, available at: https://www.pinterest.com/pin/323555554471529799/; with machine translation.

Truck Box Hitch Holder 2—Always Pinned Trailer Products, first accessed on or about Oct. 27, 2022, 6 pages, available at: https://alwayspinned.com/product/truck-box-hitch-holder/.

* cited by examiner

TRUCK BED HITCH HOLDER

FIELD

This disclosure relates generally to a system that holds and organizes one or more trailer hitches.

BACKGROUND

The use of trailer hitches for towing trailers is well known. When not being used for towing, the hitch may be removed from the receiver tube of the vehicle and stored in the vehicle. However, when stored in the vehicle the hitch may not be secured and it may move around over time and become harder to locate when it is time for use.

SUMMARY

A hitch holder is described that is configured to be secured to a vehicle and which is configured to mount one or more hitches thereon when the hitch(es) is not in use so that the hitch(es) is safely and neatly stored and easily accessible when needed for use. The hitch holder can be used with any vehicle such as, but not limited to, a pick-up truck, a flat-bed truck, a sport utility vehicle (SUV), a sedan, and the like. The hitch holder can be mounted anywhere on or in the vehicle such as, but not limited to, the bed of the pick-up truck or the flatbed truck, a rear cargo area of the SUV, the trunk of a sedan, in or to a cargo box, and other locations.

A hitch as used herein includes any hitch structure that is removably attached to a vehicle for use in towing a trailer and to which the trailer connects to. For example, a hitch can include a ball mount device on which one or more trailer balls are mountable and which is receivable in a receiver tube on the vehicle. Another example of a hitch is a pintle hitch.

In one embodiment described herein, a hitch holder of a vehicle includes a first plate, and a second plate spaced from the first plate, where the second plate is parallel to the first plate. A first opening is formed in the first plate and a second opening is formed in the second plate, with the first opening being aligned with the second opening, and the first opening and the second opening are sized to permit a first hitch to extend through the first opening and the second opening.

In one embodiment described herein, a hitch holder can include a mount plate for mounting the hitch holder to a vehicle, and a hitch holder portion integrally formed with and extending from the mount plate. The hitch holder portion includes a first plate that extends from the mount plate at an obtuse angle, and a second plate that is spaced from the first plate and is parallel thereto. A first opening is formed in the first plate and a second opening is formed in the second plate. The first opening and the second opening are aligned with one another to permit a first hitch to extend through the first opening and the second opening. In addition, a first central axis that extends through the first opening and the second opening is disposed at an angle to a horizontal plane whereby the hitch is angled slightly upward when mounted on the hitch holder.

DETAILED DESCRIPTION

Figure 1:
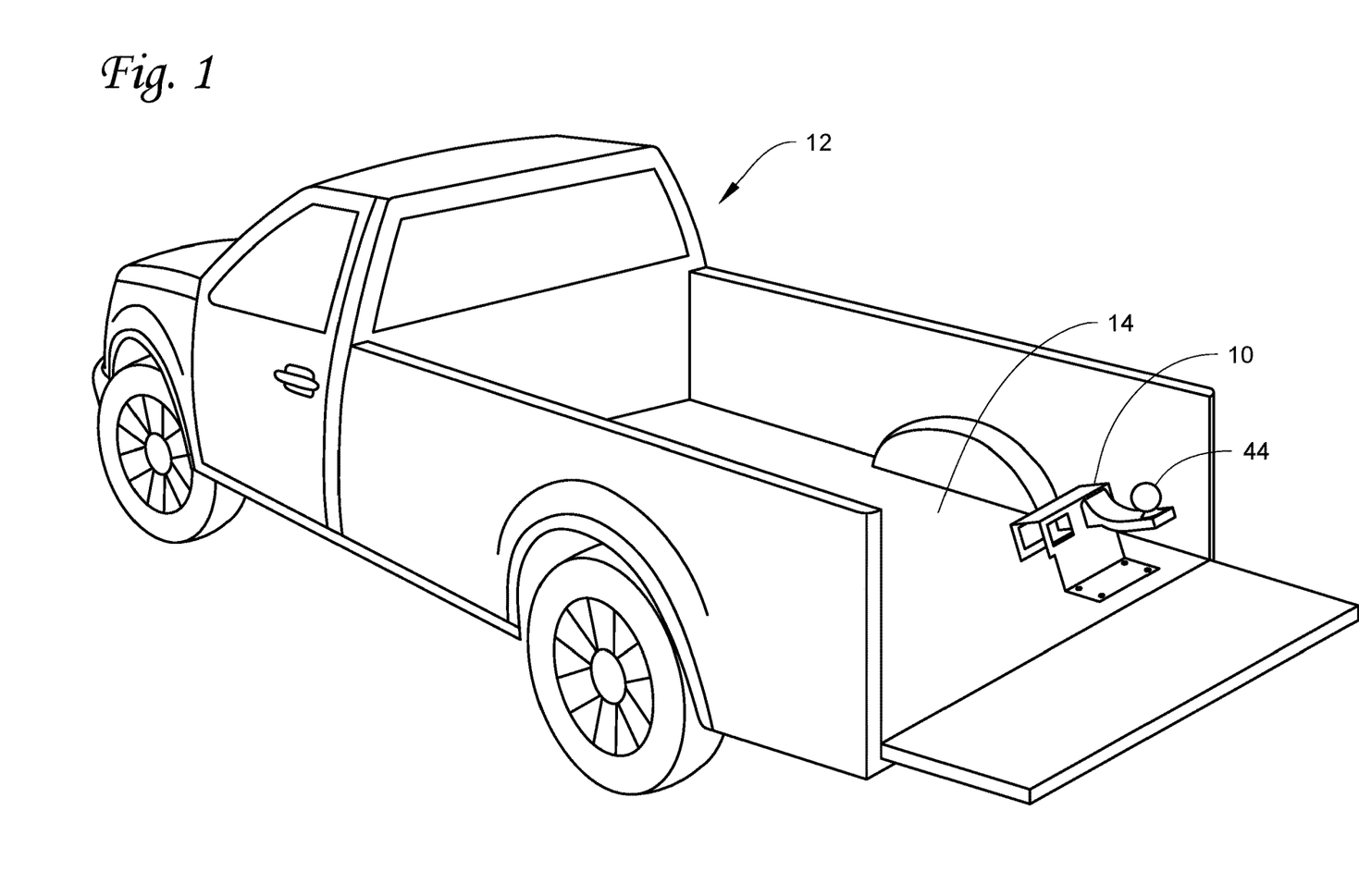
FIG. 1 illustrates a hitch holder described herein mounted on a vehicle, in particular in the bed of a pick-up truck.

FIG. 1 depicts a hitch holder 10 described herein mounted on a vehicle 12. The vehicle 12 can be any vehicle to which the hitch holder 10 described herein can be mounted. For example, FIG. 1 depicts the vehicle 12 as being a pick-up truck with the hitch holder 10 mounted in a bed 14 of the pick-up truck, for example on the floor of the bed 14. The hitch holder 10 is depicted as being mounted near the rear of the bed 14, for example near the tail gate, and located toward one side of the bed 14. However, the hitch holder 10 can be mounted at any location in the bed 14. In addition, the vehicle 12 is not limited to a pick-up truck and the vehicle 12 can be a flat-bed truck, a sport utility vehicle (SUV), a sedan, and the like. The hitch holder can be mounted anywhere on or in the vehicle 12 such as, but not limited to, the bed of the flatbed truck, a rear cargo area of the SUV, the trunk of a sedan, in or to a cargo box mounted on the vehicle, and other locations in or on the vehicle.

Figure 2:
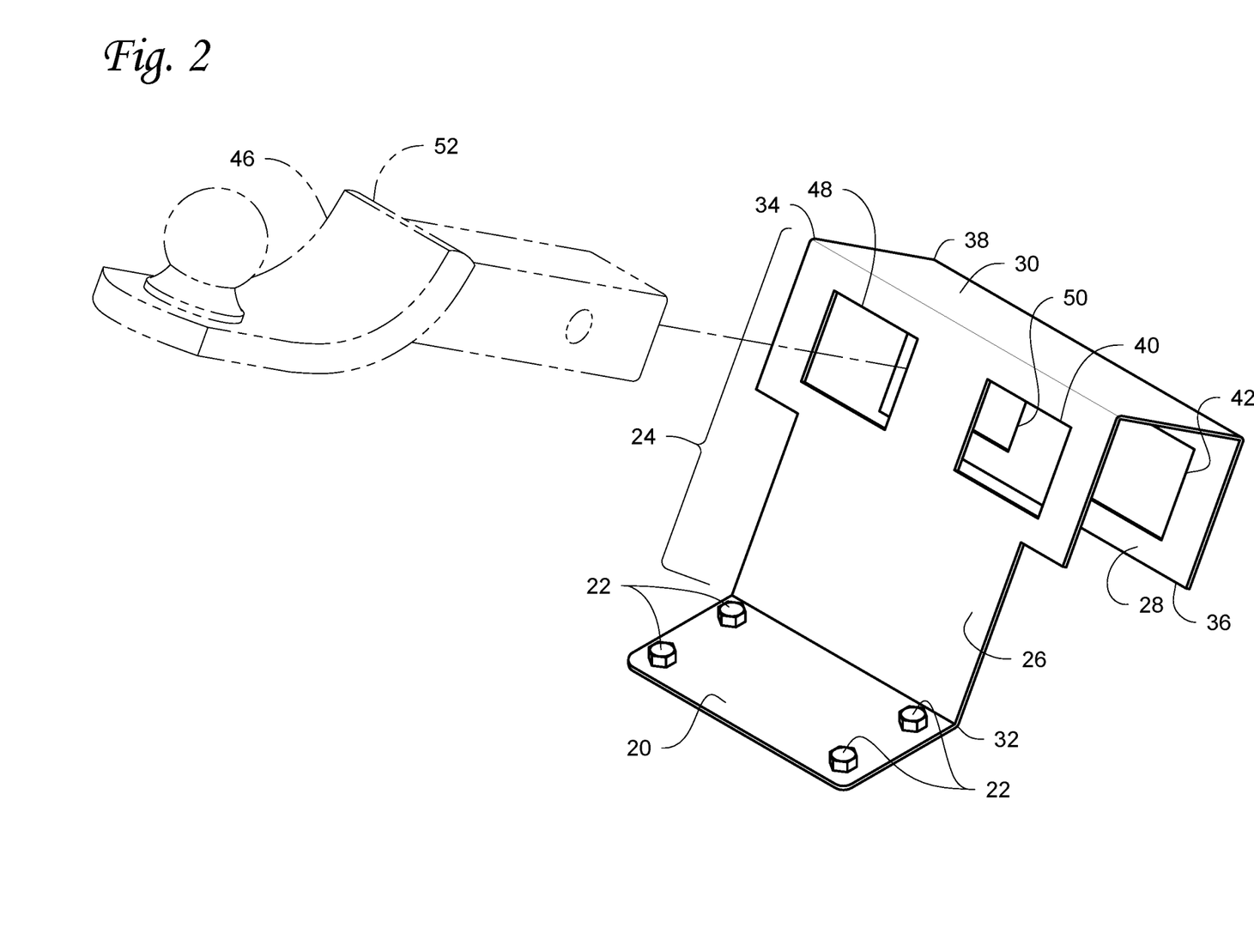
FIG. 2 is a perspective view of the hitch holder without a hitch mounted thereon.
Figure 3:
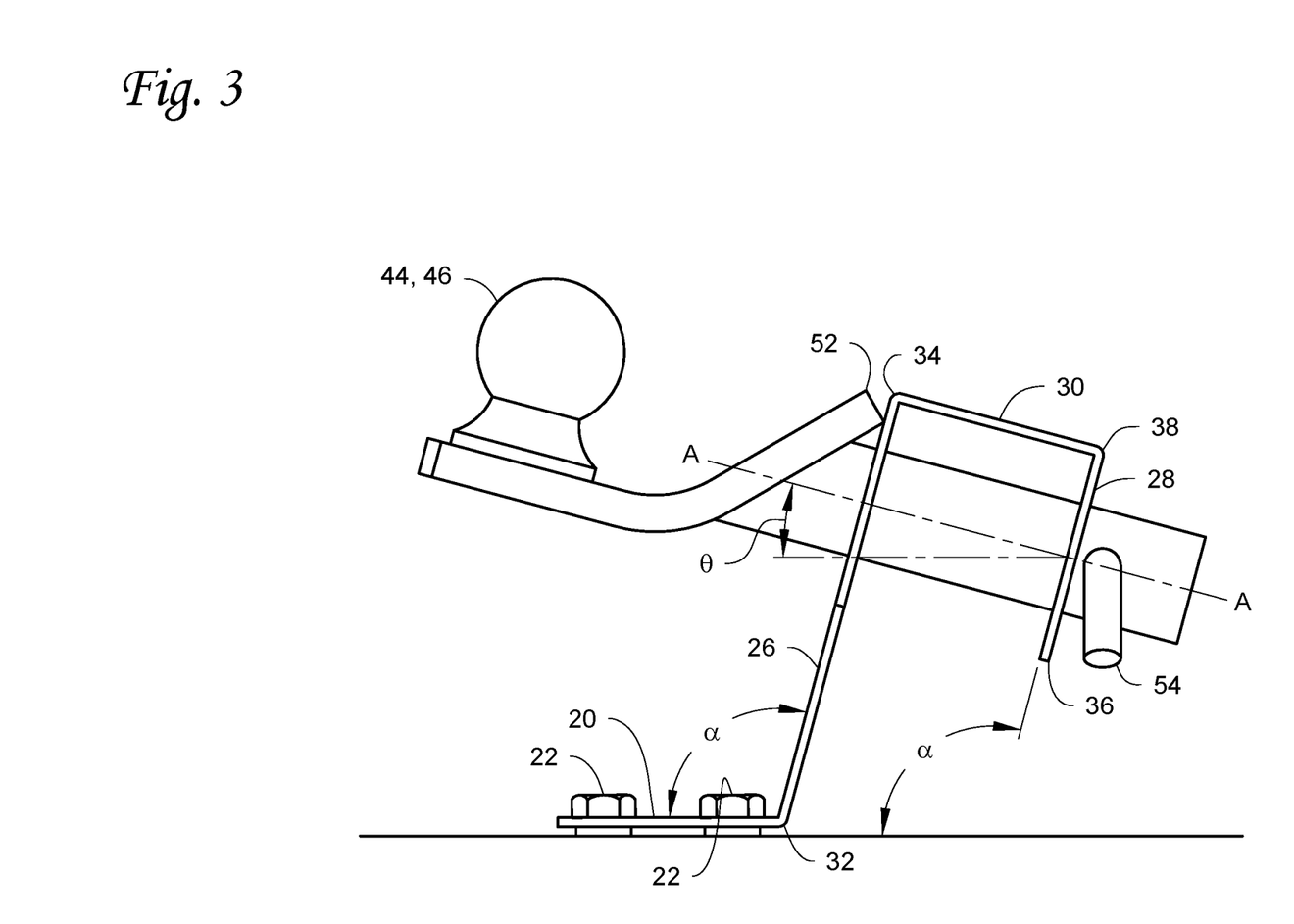
FIG. 3 depicts the hitch holder with two hitches mounted thereon.

Referring to FIGS. 1-3, the hitch holder 10 is configured to be secured to the vehicle 12 and which is configured to mount one or more hitches thereon. In the illustrated example, the hitch holder 10 includes a mount plate 20 for mounting the hitch holder 10 to the vehicle 12 for example using a plurality of mechanical fasteners 22 such as bolts or screws.

A hitch holder portion 24 is integrally formed with and extends from the mount plate 20. The hitch holder portion 24 includes a first plate 26, a second plate 28 and a connecting plate 30. The plates 20, 26, 28, 30 are substantially planar structures that may be integrally formed with one another from a single piece of metal such as steel that is bent to form the hitch holder 10. The plates 20, 26, 28, 30 can all have the same thickness.

The first plate 26 extends from a first end 32 connected to the mount plate 20 to a second end 34 which is attached to a first end of the connecting plate 30. The first plate 26 extends from the mount plate 20 at an obtuse angle α relative to the mount plate 20 and relative to a horizontal plane. For example, the angle α may be about 120 degrees. However, other angles α are possible. The second plate 28 is spaced from the first plate 26 and is parallel thereto whereby the second plate 28 is also disposed at the angle α relative to the horizontal plane. The second plate 28 includes a first, free end 36 that is not directly attached to any other structure and a second end 38 that is attached to a second end of the connecting plate 30. Therefore, the second plate 28 has a length from the first end to the second end thereof that is less than the length of the first plate 26 from the first end to the second end thereof whereby the second plate 28 partially overlaps the first plate 26. The connecting plate 30 extends between and interconnects the first plate 26 and the second plate 28.

The first plate 26 includes a first opening 40 formed therethrough and the second plate 28 includes a second opening 42 formed therethrough. The first opening 40 and the second opening 42 are aligned with one another to permit a first hitch 44 (see FIG. 3) to extend through the first opening 40 and the second opening 42 when mounted in position on the hitch holder 10. The hitch holder 10 can be configured just to hold the first hitch 44. In another embodiment, the hitch holder 10 can be configured to hold a second hitch 46 (see FIG. 2) in which case the first plate 26 includes a third opening 48 formed therethrough and the second plate 28 includes a fourth opening 50 formed therethrough. The third opening 48 and the fourth opening 50 are aligned with one another to permit the second hitch 46 to extend through the third opening 48 and the fourth opening 50 when mounted in position on the hitch holder 10. The connecting plate 30 is located above the openings 40, 42, 48, 50.

The openings 40, 42 (and the openings 48, 50 if present) can have any shape that allows the hitch(es) 44, 46 to extend therethrough, such as square, rectangular, round, oval, and the like. The openings 40, 42, 48, 50 are depicted as being substantially square with a size slightly greater than the size of the hitches 44, 46 so that the hitches 44, 46 can fit through the openings 40, 42, 48, 50 with minimal clearance therebetween in order to minimize movement of the hitches 44, 46 relative to the holder 10.

As best seen in FIGS. 2 and 3, each of the hitches 44, 46 have a flange 52 that abuts against the front surface of the first plate 26 when fully installed. Each hitch 44, 46 further includes a hitch pin hole that receives a hitch pin 54 in conventional manner. When the hitch(es) 44, 46 is fully installed, the hitch pin hole is located past the second plate 28. By installing the hitch pin 54 in the hitch pin hole, the hitch 44, 46 is locked in the holder 10 with minimal forward, rearward, side-to-side, and up and down movement. In other words, a distance between the first opening 40 and the second opening 42 (and similarly between the holes 48, 50) is less than a distance between the flange 52 and the hitch pin hole.

As best seen in FIG. 3, a first central axis A-A extends through the first opening 40 and the second opening 42. The axis A-A is disposed at an angle θ to a horizontal plane. For example, the angle θ may be about 30 degrees. However, other angles θ are possible. A second central axis also extends through the third opening 48 and the fourth opening 50 that is disposed at the angle θ to a horizontal plane. Accordingly, when the hitch(es) 44, 46 is mounted to the holder 10, the hitch(es) 44, 46 is disposed at the upward angle θ which helps to retain the hitch(es) 44, 46 in the holder 10 during use of the vehicle 12.

Figure 4A:
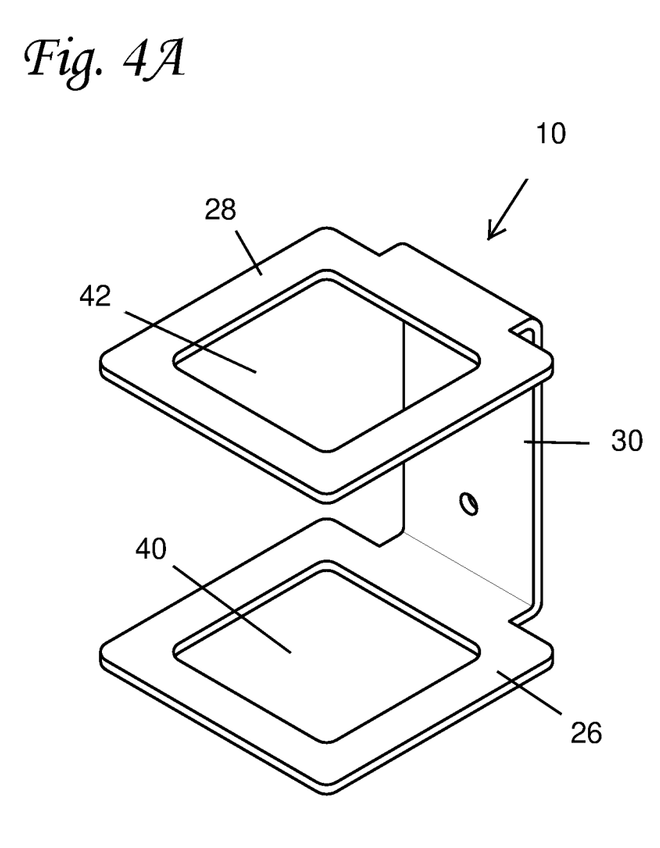
FIGS. 4A and 4B illustrate additional embodiments of hitch holders.

FIG. 4A illustrates another embodiment of the hitch holder 10 with the first plate 26, the second plate 28 and the connecting plate 30. The first plate 26 includes the first opening 40, and the second plate 28 includes the second opening 42. In this embodiment, the openings 40, 42 are rectangular, for example square. In addition, instead of the mount plate 20 like in FIGS. 2-3, the connecting plate 30 functions as the mount plate for mounting the hitch holder 10 to the vehicle. Preferably, the hitch holder 10 in FIG. 4A is mounted so that the central axis of the openings 40, 42 is vertical instead of being at an angle like in FIGS. 2-3. However, the hitch holder 10 can be mounted so that the central axis is at an angle to vertical. In addition, in FIG. 4A, a hitch (not shown) is received through the aligned openings 40, 42 in a manner similar to FIGS. 2-3, and the hitch can be secured in position using a hitch pin like shown in FIG. 3.

Figure 4B:
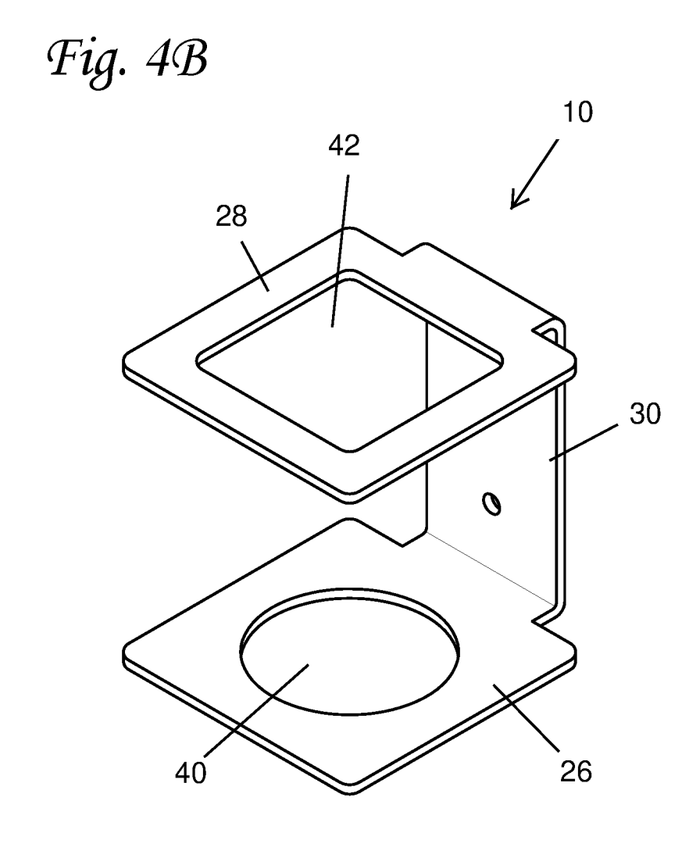

FIG. 4B illustrates another embodiment of the hitch holder 10 with the first plate 26, the second plate 28 and the connecting plate 30. The first plate 26 includes the first opening 40, and the second plate 28 includes the second opening 42. In this embodiment, the opening 40 is illustrated as being circular while the opening 42 is illustrated as being rectangular, for example square. In addition, the connecting plate 30 functions as the mount plate for mounting the hitch holder 10 to the vehicle. Preferably, the hitch holder 10 in FIG. 4B is mounted so that the central axis of the openings 40, 42 is vertical instead of being at an angle like in FIGS. 2-3. However, the hitch holder 10 can be mounted so that the central axis is at an angle to vertical. In addition, in FIG. 4B, a hitch (not shown) is received through the aligned openings 40, 42 in a manner similar to FIGS. 2-3, and the hitch can be secured in position using a hitch pin like shown in FIG. 3.

Figure 5:
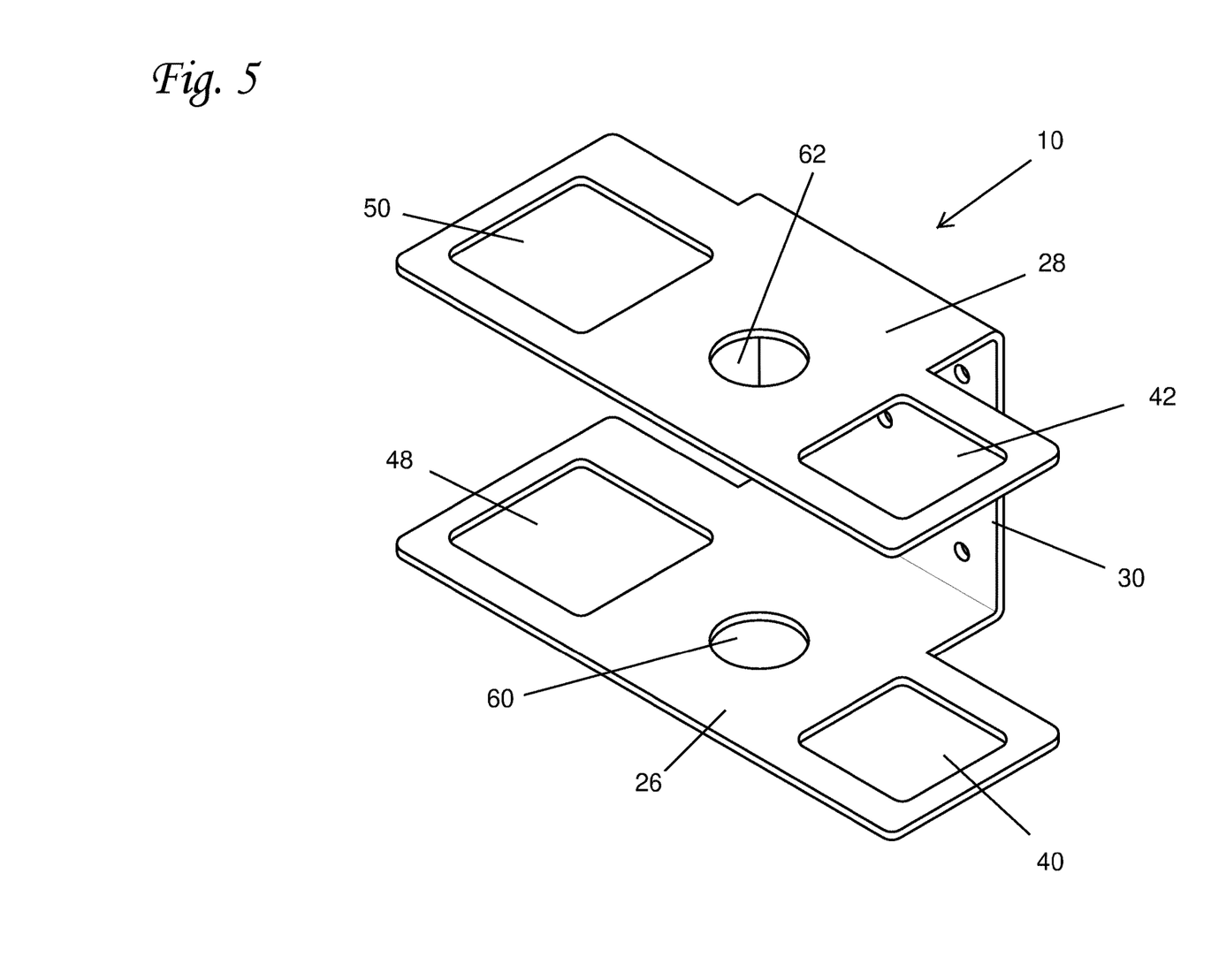
FIG. 5 illustrates another embodiment of a hitch holder.

FIG. 5 illustrates another embodiment of the hitch holder 10 with the first plate 26, the second plate 28 and the connecting plate 30. The first plate 26 includes the first opening 40 and the third opening 48, and the second plate 28 includes the second opening 42 and the fourth opening 50. In this embodiment, the aligned openings 40, 42 are square, while the aligned openings 48, 50 are rectangular with unequal length sides. However, all of the openings 40, 42, 48, 50 can be square or all of the openings can be rectangular. In addition, instead of the mount plate 20 like in FIGS. 2-3, the connecting plate 30 functions as the mount plate for mounting the hitch holder 10 to the vehicle. Preferably, the hitch holder 10 in FIG. 5 is mounted so that the central axis of the openings 40, 42 and the central axis of the openings 48, 50 are vertical instead of being at an angle like in FIGS. 2-3. However, the hitch holder 10 can be mounted so that the central axes are at an angle to vertical. In addition, in FIG. 5, hitches (not shown) are received through the aligned openings 40, 42 and 48, 50 in a manner similar to FIGS. 2-3, and the hitches can be secured in position using a hitch pin like shown in FIG. 3.

In addition, FIG. 5 depicts optional aligned hitch pin holes 60, 62 in the first and second plates 26, 28, respectively. The hitch pin holes 60, 62 are sized to receive the hitch pin whereby the hitch holder 10 can also hold the hitch pin in addition to the hitches. Additional aligned hitch pin holes can be formed in the plates 26, 28 in order to hold one or more additional hitch pins. The hitch pin holes described herein can be formed on any of the embodiments described herein.

Figure 6:
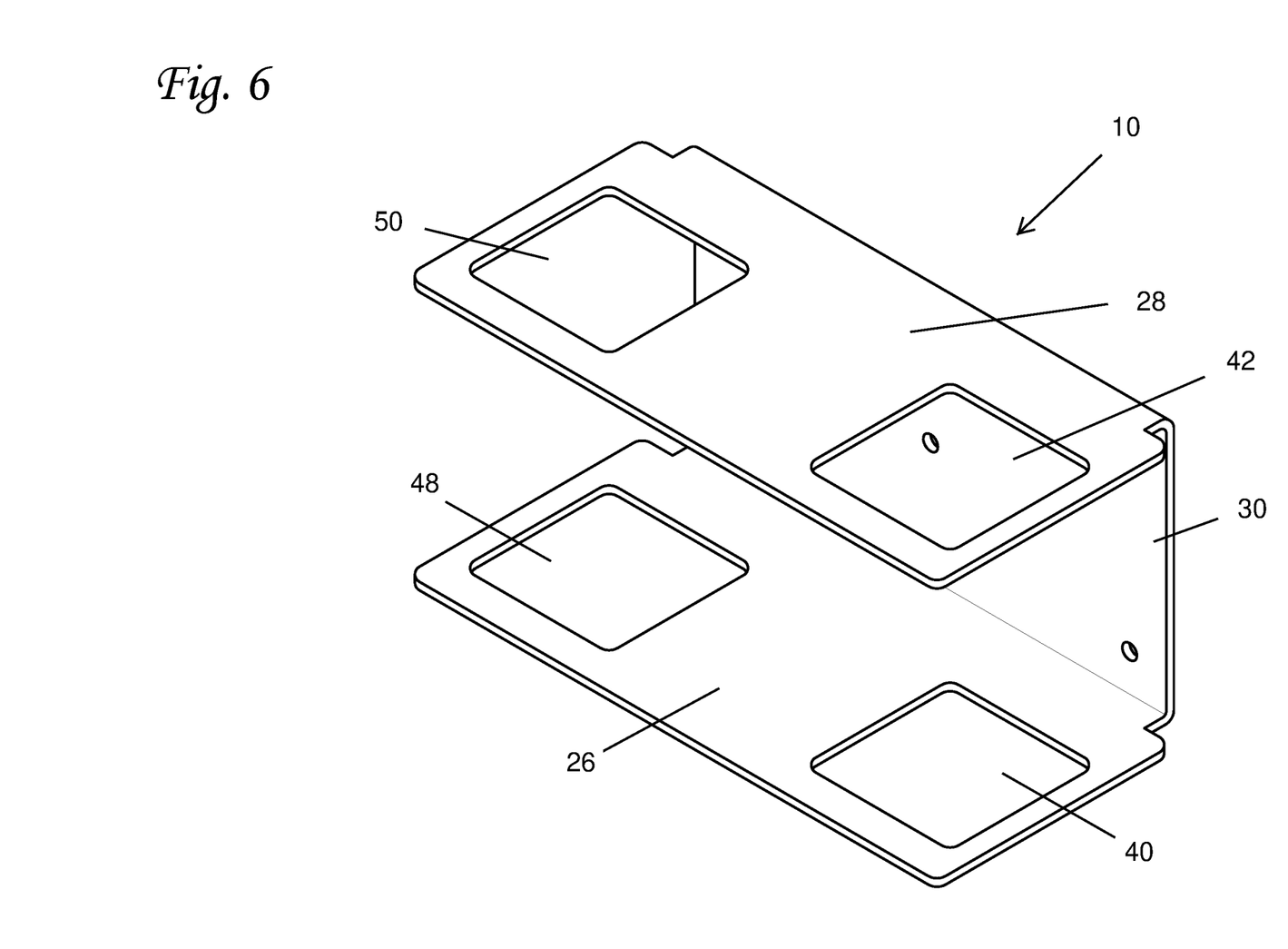
FIG. 6 illustrates another embodiment of a hitch holder.

FIG. 6 illustrates an embodiment of the hitch holder 10 that is similar to the hitch holder 10 in FIG. 5. In this embodiment, the hitch holder is not illustrated as including the aligned hitch pin holes depicted in FIG. 5. In this embodiment, the aligned openings 40, 42 are square, while the aligned openings 48, 50 are rectangular with unequal length sides. However, all of the openings 40, 42, 48, 50 can be square or all of the openings can be rectangular. In addition, instead of the mount plate 20 like in FIGS. 2-3, the connecting plate 30 functions as the mount plate for mounting the hitch holder 10 to the vehicle. Preferably, the hitch holder 10 in FIG. 6 is mounted so that the central axis of the openings 40, 42 and the central axis of the openings 48, 50 are vertical instead of being at an angle like in FIGS. 2-3. However, the hitch holder 10 can be mounted so that the central axes are at an angle to vertical. In addition, in FIG. 6, hitches (not shown) are received through the aligned openings 40, 42 and 48, 50 in a manner similar to FIGS. 2-3, and the hitches can be secured in position using a hitch pin like shown in FIG. 3.

Figure 7:
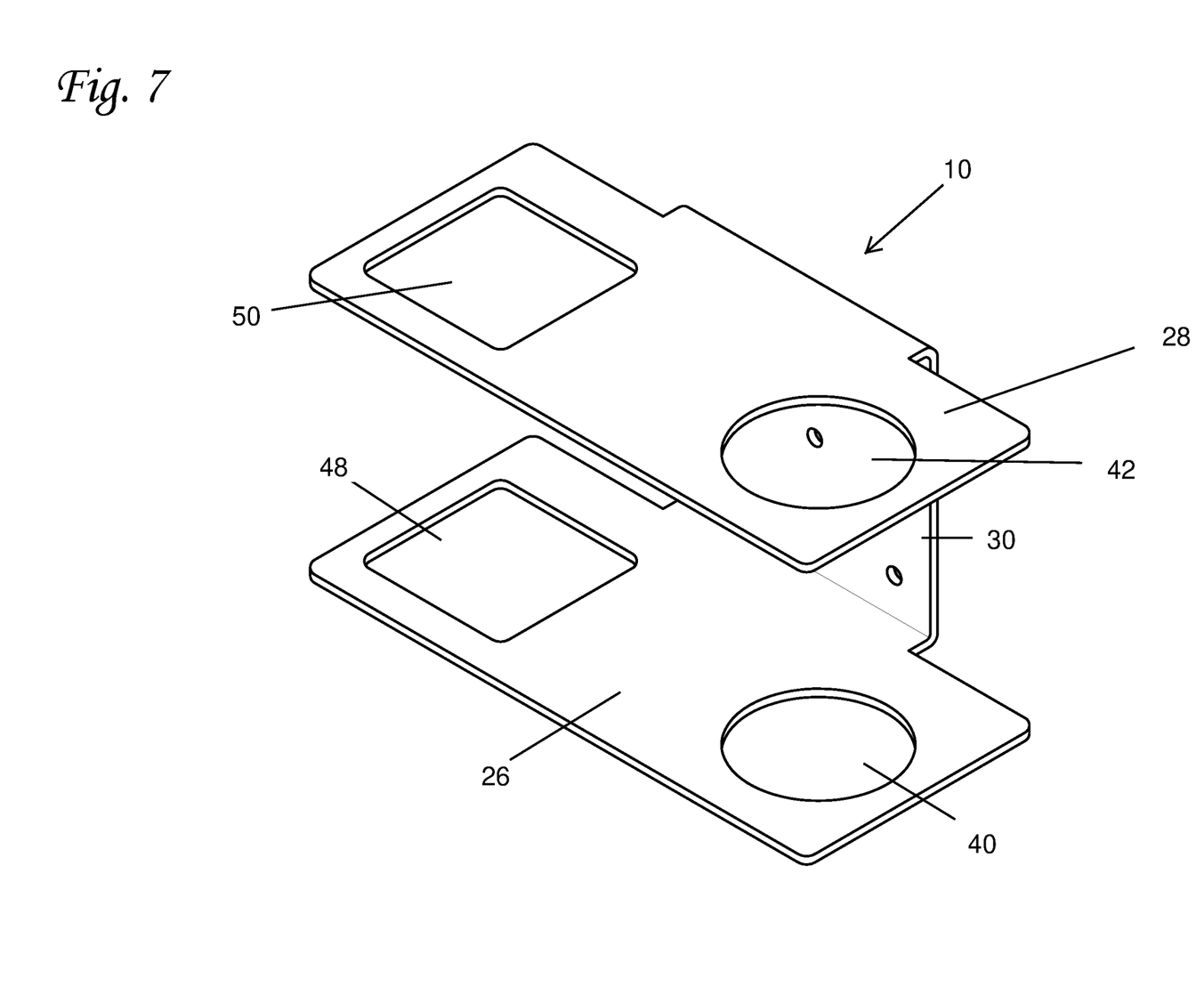
FIG. 7 illustrates another embodiment of a hitch holder.
Figure 8:
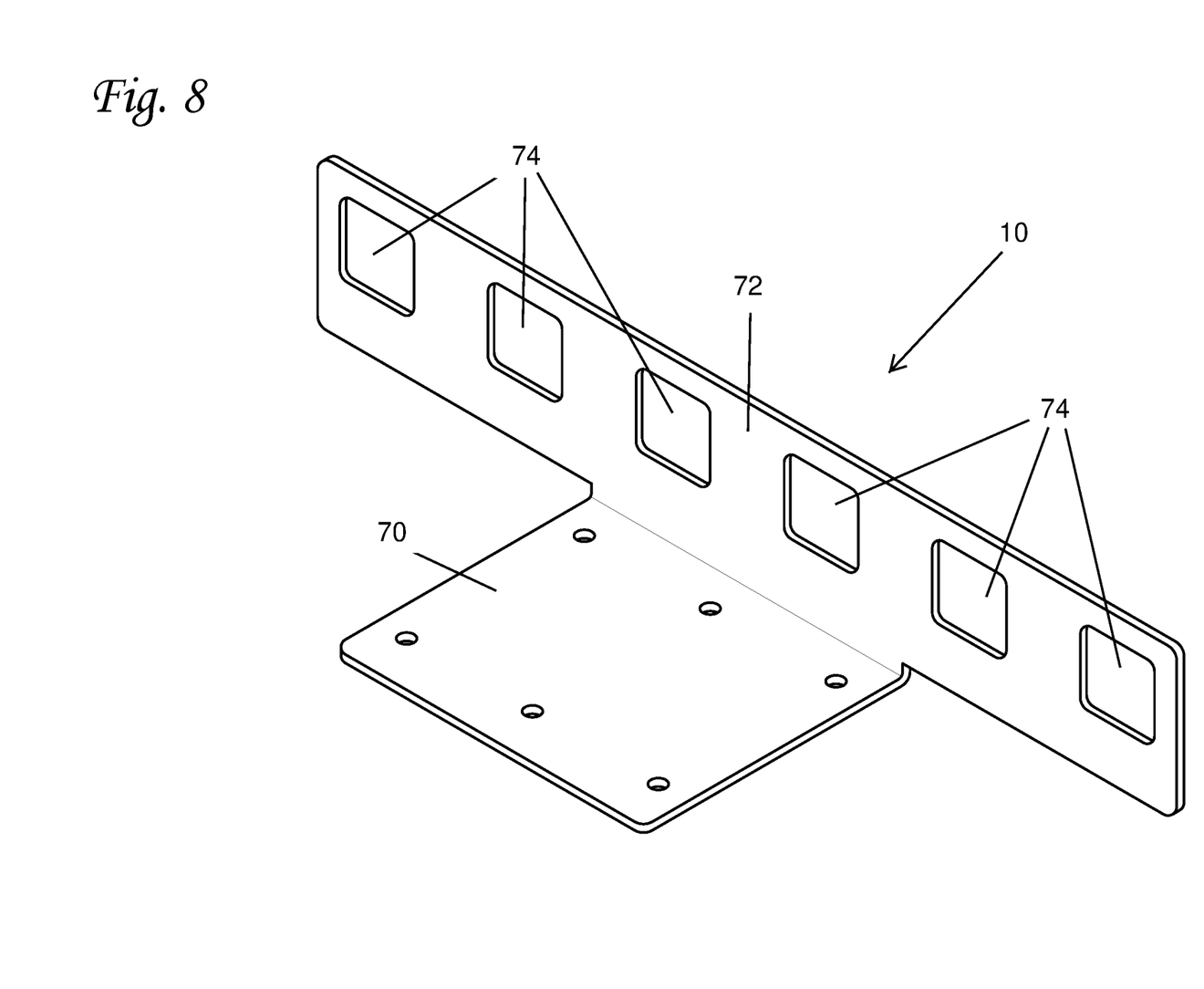
FIG. 8 illustrates another embodiment of a hitch holder.

FIG. 7 illustrates an embodiment of the hitch holder 10 that is similar to the hitch holder 10 in FIGS. 5 and 6. In this embodiment, the hitch holder is not illustrated as including the aligned hitch pin holes depicted in FIG. 5. In this embodiment, the aligned openings 40, 42 are circular, while the aligned openings 48, 50 are rectangular, for example square. In addition, instead of the mount plate 20 like in FIGS. 2-3, the connecting plate 30 functions as the mount plate for mounting the hitch holder 10 to the vehicle. Preferably, the hitch holder 10 in FIG. 7 is mounted so that the central axis of the openings 40, 42 and the central axis of the openings 48, 50 are vertical instead of being at an angle like in FIGS. 2-3. However, the hitch holder 10 can be mounted so that the central axes are at an angle to vertical. In addition, in FIG. 7, hitches (not shown) are received through the aligned openings 40, 42 and 48, 50 in a manner similar to FIGS. 2-3, and the hitches can be secured in position using a hitch pin like shown in FIG. 3.

FIG. 7 illustrates an embodiment of the hitch holder 10 that includes a mount plate 70 for mounting the hitch holder 10, and a single plate 72 having a plurality of openings 74 formed therein that can receive hitches. The plate 72 is illustrated as having six of the openings 74 but a smaller or larger number of the openings 74 can be provided. In this embodiment, the hitch holder 10 is most suited for mounting in a non-moving environment, for example mounting on a shop table or on a shop wall.

Additional aspects of the hitch holder can include the following.

Aspect 1. A hitch holder of a vehicle can comprise a mount plate for mounting the hitch holder to the vehicle; a hitch holder portion integrally formed with and extending from the mount plate, the hitch holder portion includes a first plate that extends from the mount plate at an obtuse angle, and a second plate that is spaced from the first plate and is parallel thereto; a first opening in the first plate and a second opening in the second plate, the first opening and the second opening are aligned with one another to permit a first hitch to extend through the first opening and the second opening, and a first central axis that extends through the first opening and the second opening is disposed at an angle to a horizontal plane.

Aspect 2. The hitch holder of aspect 1, and the first plate and the second plate overlap each other, and the first plate has a length that is greater than a length of the second plate.

Aspect 3. The hitch holder of aspect 1 or aspect 2 can also include a third opening in the first plate and a fourth opening in the second plate, the third opening and the fourth opening are aligned with one another to permit a second hitch to extend through the third opening and the fourth opening, and a second central axis that extends through the third opening and the fourth opening is disposed at an angle to a horizontal plane.

Aspect 4. The hitch holder of aspect 1, and a distance between the first opening and the second opening is less than a distance between a flange on the first hitch and hitch pin hole formed in the first hitch.

Aspect 5. The hitch holder of aspect 1 can also include a connecting plate that interconnects the first plate and the second plate, and the connecting plate is located above the first opening and the second opening.

Aspect 6. The hitch holder of claim 1, and the second plate has a free end.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A hitch holder of a vehicle, comprising:
    a first plate;
    a second plate spaced from the first plate, the second plate is parallel to the first plate;
    the first plate and the second plate each have a first side edge, a second side edge parallel to the first side edge, and a maximum width defined between the first side edge and the second side edge;
    a first opening in the first plate and a second opening in the second plate, the first opening is aligned with the second opening, and the first opening and the second opening are sized to permit a first hitch to extend through the first opening and the second opening;
    a planar connecting plate that interconnects the first plate and the second plate, the planar connecting plate has a first end connected to an end of the first plate and a second end connected to an end of the second plate; the planar connecting plate has a third side edge, a fourth side edge that is parallel to the third side edge, and a width defined between the third side edge and the fourth side edge, and the width of the planar connecting plate is less than the maximum width of the first plate and less than the maximum width of the second plate;
    a plurality of fastener holes in the planar connecting plate.

2. The hitch holder of claim 1, wherein the first opening and the second opening are rectangular.

3. The hitch holder of claim 1, wherein the first opening has a shape that differs from a shape of the second opening.

4. The hitch holder of claim 1, further comprising a first shear pin hole in the first plate and a second shear pin hole in the second plate, the first shear pin hole is aligned with the second shear pin hole, and the first shear pin hole and the second shear pin hole are configured to receive a shear pin therethrough.

5. The hitch holder of claim 1, further comprising a third opening in the first plate and a fourth opening in the second plate, the third opening and the fourth opening are aligned with one another to permit a second hitch to extend through the third opening and the fourth opening.

6. The hitch holder of claim 5, wherein the first opening and the second opening are rectangular, and the third opening and the fourth opening are rectangular.

7. The hitch holder of claim 5, wherein the first opening and the second opening are square, and the third opening and the fourth opening are square.

8. The hitch holder of claim 5, wherein the first opening and the second opening have a same first size, and the third opening and the fourth opening have a same second size.

9. The hitch holder of claim 8, wherein the first size differs from the second size.

10. A pick-up truck comprising:
    a truck body with a bed and a tail gate;
    a hitch holder mounted in the bed of the truck body, the hitch holder comprises:
    a first plate;
    a second plate spaced from the first plate, the second plate is parallel to the first plate;
    the first plate and the second plate each have a first side edge, a second side edge parallel to the first side edge, and a maximum width defined between the first side edge and the second side edge;
    a first opening in the first plate and a second opening in the second plate, the first opening is aligned with the second opening, and the first opening and the second opening are sized to permit a first hitch to extend through the first opening and the second opening;
    a planar connecting plate that interconnects the first plate and the second plate, the planar connecting plate has a first end connected to an end of the first plate and a second end connected to an end of the second plate; the planar connecting plate has a third side edge, a fourth side edge that is parallel to the third side edge, and a width defined between the third side edge and the fourth side edge, and the width of the planar connecting plate is less than the maximum width of the first plate and less than the maximum width of the second plate; and a plurality of mechanical fasteners extending through the planar connecting plate and attaching the hitch holder to the truck body.

11. The pick-up truck of claim 10, wherein the first opening and the second opening are rectangular.

12. The pick-up truck of claim 10, wherein the first opening has a shape that differs from a shape of the second opening.

13. The pick-up truck of claim 10, further comprising a first shear pin hole in the first plate and a second shear pin hole in the second plate, the first shear pin hole is aligned with the second shear pin hole, and the first shear pin hole and the second shear pin hole are configured to receive a shear pin therethrough.

14. The pick-up truck of claim 10, further comprising a third opening in the first plate and a fourth opening in the second plate, the third opening and the fourth opening are aligned with one another to permit a second hitch to extend through the third opening and the fourth opening.

15. The pick-up truck of claim 14, wherein the first opening and the second opening are rectangular, and the third opening and the fourth opening are rectangular.

16. The pick-up truck of claim 14, wherein the first opening and the second opening are square, and the third opening and the fourth opening are square.

17. The pick-up truck of claim 14, wherein the first opening and the second opening have a same first size, and the third opening and the fourth opening have a same second size.

18. The pick-up truck of claim 17, wherein the first size differs from the second size.

19. A vehicle comprising:
a vehicle body with a plurality of wheels;
a hitch holder attached to the vehicle body by a plurality of mechanical fasteners, the hitch holder comprises:
  a first plate;
  a second plate spaced from the first plate, the second plate is parallel to the first plate;
  the first plate and the second plate each have a first side edge, a second side edge parallel to the first side edge, and a maximum width defined between the first side edge and the second side edge;
  a planar connecting plate that interconnects the first plate and the second plate, the planar connecting plate has a first end connected to an end of the first plate and a second end connected to an end of the second plate; the planar connecting plate has a third side edge, a fourth side edge that is parallel to the third side edge, and a width defined between the third side edge and the fourth side edge, and the width of the planar connecting plate is less than the maximum width of the first plate and less than the maximum width of the second plate;
  a first opening in the first plate and a second opening in the second plate, the first opening is aligned with the second opening, and the first opening and the second opening are sized to permit a first hitch to extend through the first opening and the second opening.

* * * * *